United States Patent Office 2,713,847
Patented July 26, 1955

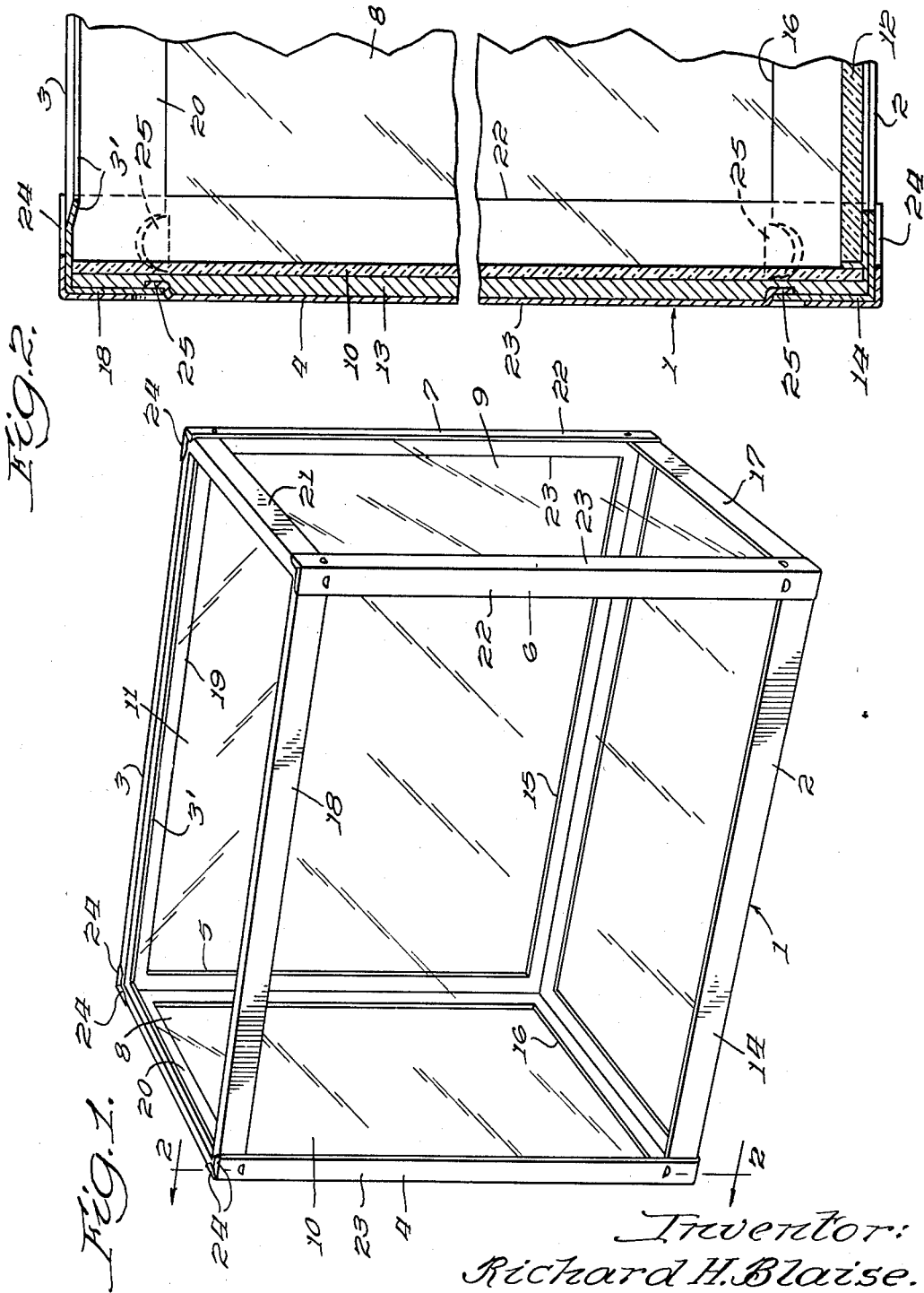

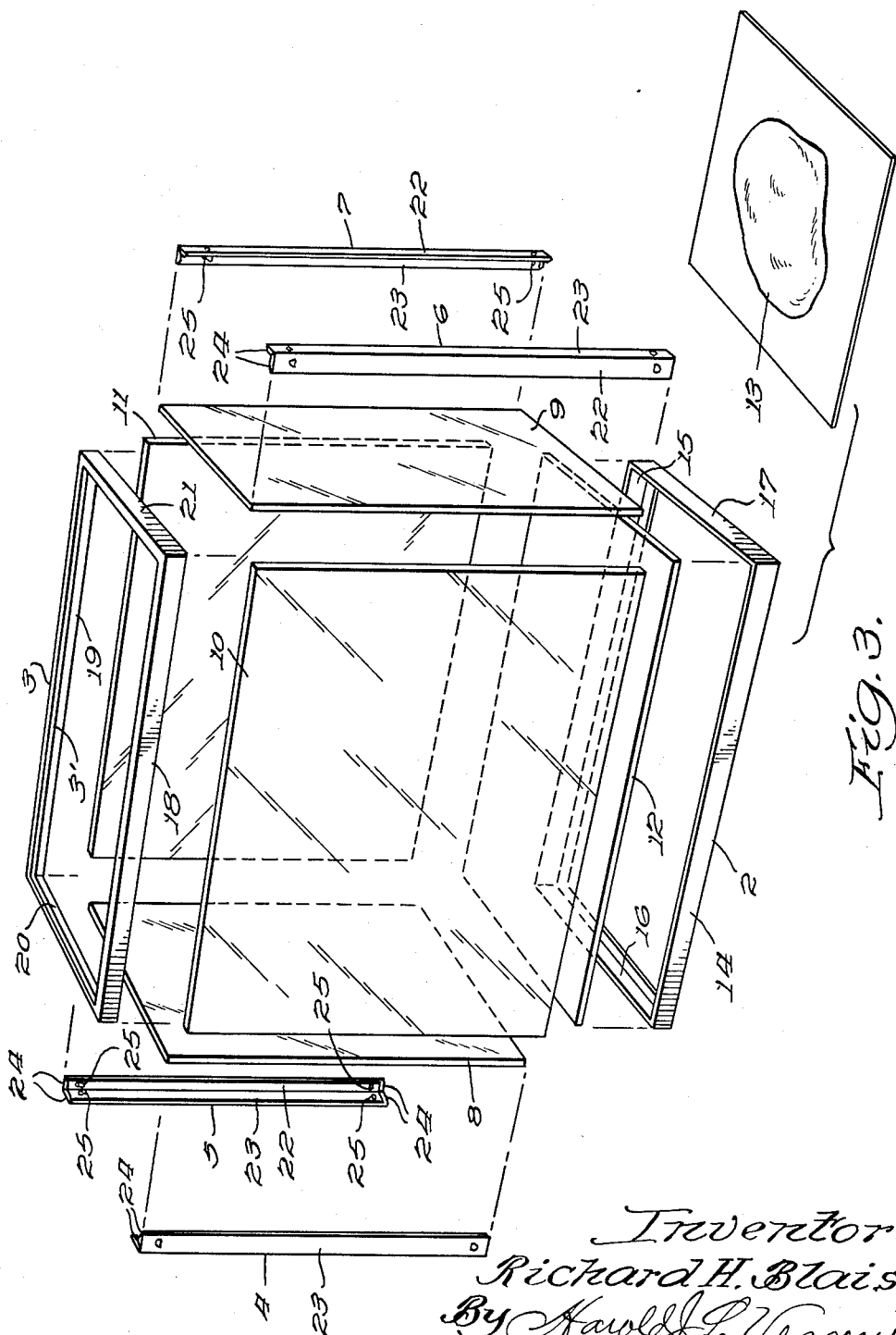

2,713,847

AQUARIUM TANK CONSTRUCTION

Richard H. Blaise, Glendale, Calif.

Application September 2, 1952, Serial No. 307,540

1 Claim. (Cl. 119—5)

This invention relates to aquariums and more particularly to an improved and novel form thereof composed of parts which are readily susceptible of assembly by the purchaser of a kit of component parts.

Heretofore, aquariums of the smaller sizes such as are commonly used by fanciers of tropical fish and the like have been marketed in completed form. The assembled aquarium is bulky and because of the use of glass for the sides and bottom must be handled with great care in packing and shipping from the manufacturer to the dealer and finally to the purchaser. Moreover, in such event, if the product leaked when first put in use, the exchange or cost of repair fell on the manufacturer. Where the aquarium is sold as a knocked down kit to be assembled by the purchaser, the size of the package is greatly reduced, enabling a greater quantity to be stocked in a given space, the component parts are easier and better packed with less liability of breakage, the cost to the purchaser is greatly reduced, and the problem of responsibility for leakage is eliminated entirely.

The problem presented by these considerations is the creation of a design of aquarium construction which is capable of assembly by persons not possessing special skill in that art with reasonable assurance that if simple directions are followed, a satisfactory aquarium can be produced.

The principal object of the present invention therefore, is to provide an aquarium composed of as few parts as possible all of which are susceptible of assembly by persons of limited skill in that art to produce a satisfactory aquarium.

Another object of the invention is to provide an aquarium composed of as few parts as possible all of which are susceptible of assembly by persons of limited skill in that art to produce a satisfactory aquarium.

Another object of the invention is to provide an aquarium construction comprising glass sides and bottom panels and a metal frame structure; the latter being constructed and arranged to effect self-interlocking interconnection between the component frame members.

A further object of the invention is to provide an aquarium construction kit comprising the glass panel elements for the sides and bottom of the aquarium and a knocked down frame construction including structural members having integrally formed interlocking means susceptible of assembly by persons not skilled in aquarium construction.

With the foregoing objects in view, together with such other objects and advantages as may subsequently appear, the invention resides in the parts, and in the construction, combination, and arrangement of parts described, by way of example, in the following specification of a representative mode of execution of the invention; reference being had to the accompanying drawings which form a part of said specification and in which drawings:

Fig. 1 is a perspective view of an aquarium embodying the present invention,

Fig. 2 is an enlarged transverse, sectional view taken on the line 2—2 of Fig. 1, and Fig. 3 is an exploded, perspective view of the component parts of the aquarium.

The illustrated embodiment of the invention comprises a frame structure 1 including a bottom frame member 2, a top frame member 3 and vertically disposed corner members 4, 5, 6 and 7, end panels 8 and 9, side panels 10 and 11, and a bottom panel 12; all of said panels being preferably formed of glass. Additionally, the structure includes a layer or coating of sealing putty 13 on all surfaces of the frame structure adjacent to the glass panels.

The bottom frame member 2 is formed from sheet metal (preferably but not necessarily, zinc) and is first formed as a flat, hollow rectangle having corner forming notches cut in the exterior corners. The outer portion of the flat blank is then bent at right angles along a line about at the mid width of the side and end portions with resultant formation of upstanding side flange portions 14 and 15 and end flange portions 16 and 17.

The top frame member 3 is similarly formed from sheet metal with depending side flange portions 18 and 19 and end flanges 20 and 21; the inner edge 3' being slightly inturned.

The four corner members are identical and a description of one will suffice for all. Each corner member is formed from sheet metal strip bent at right angles along a medial longitudinal line to form side flange portions 22 and 23; the opposite ends of the strip being provided with a centrally disposed V-shaped notch and the resulting end tabs 24, 24 being bent inwardly to form partially closed ends for each corner member. Additionally each flange portion at each end thereof is provided with an inwardly projecting tongue 25 disposed from the end tabs 24 a distance slightly greater than the width of the flange portions of the top and bottom frame members.

The complete kit comprises the five panels, the top and bottom frame members, four corner members and a quantity of sealing putty. In packing, the two side panels may be placed in a box and the frame members nested together and placed on the side panels; the fact that the bent flange portions of the top and bottom frame members are not connected at the corners permitting such nesting with a minimum of distortion. The bottom panel is placed within the frame members and the end panels are placed on the bottom panel. The corner members are placed alongside of the nested frame members and the necessary quantity of putty enclosed in a suitable flexible plastic casing and formed into a thin flat elongated mass is placed on the top of the side panels. Suitable paper is placed between all adjoining glass surfaces. In this form, the component parts of the aquarium may be enclosed in a box having about one fourth the cubic space that would be required for a properly packed completely assembled aquarium. Further, the manufacturer has not been subjected to assembly expense and the risk of shipment is greatly reduced, all these factors resulting in a greatly reduced cost and consequent greater appeal to purchasers. Still further, since there has been no assembly, the consequence of returned merchandise for defective construction deriving from leaks is completely eliminated. The fact that this common cause for complaint is eliminated and the ease of storing and delivering the merchandise in this kit form both make the item extremely attractive to merchants.

To set up the aquarium from the kit materials, the top and bottom frame members 2 and 3 are first inspected to be sure that the flange portions are at right angles to the inner or side portion thereof and, if necessary, the flange portions are bent inwardly until the ends thereof are in alignment at the corners. The corner members are then applied to the outside of the corners of the frame members and secured thereon by bending down the tongues 25 over the edges of the flanges of the frame members as best shown in Fig. 2 with resultant formation of the frame structure 1. The sealing putty is then applied in smooth even layers on all inner surfaces of the frame structure except the under side of the inner flange portion of the top frame member or, in other words, on all surfaces of the frame structure having a panel supporting function. The side panel members are of a size closely fitting the layers of putty applied to engage the bottom and end panels and are first applied to the frame structure by being pressed against the putty lining the engaged inner surfaces of the corner members and frame members. The end panels are of the same height as the side panels, but in width fit between the sides of the side panels and are next similarly pressed into position against the putty lining the end flanges of the top and bottom frame members and the adjacent portions of the corner members. Lastly, the bottom panel is pressed into position thus serving also to hold the bottom edges of the side and end panels against inward displacement as the end panels correspondingly serve to hold the side panels in place. Finally, any extruded portions of the putty projecting between the edges of the panels or protruding beyond the edges of the frame structure on the exterior of the assembly is removed and the assembled aquarium is ready for testing for leaks and upon completion of testing and any indicated further sealing, is ready to be put into use.

Thus there has been created a novel and improved type of aquarium construction which makes a sturdy and reliable aquarium, which is simple in construction and composed of parts which are capable of being interlocked with each other without the use of separate fastening devices and which parts are additionally susceptible of economical manufacture.

While in the foregoing specification there has been described and illustrated one embodiment of the invention, it is not to be inferred that the invention is limited to the exact form disclosed, and it will be understood that the invention embraces all such modifications in the parts and in the construction, combination and arrangement of parts as shall come within the purview of the appended claim.

I claim:

In an aquarium tank, a wall structure comprising end, side and bottom panels of glass and a supporting frame enclosing the meeting edges of said panels; said frame comprising a bottom frame member formed of sheet metal and including a bottom surface of hollow, rectangular configuration and upwardly extending side and end flanges co-extensive with the outer perimeter of said bottom surface, a top frame member of generally similar configuration to said bottom frame member and including side and end flanges coextensive in length with the outer perimeter of said top frame member, and four corner members disposed one at each juncture of a side and end panel and disposed exteriorly of the corresponding corners of said frame members; each of said corner members including end portions underlying the bottom frame member and overlying the top frame member and having flange portions engaging and extending parallel to the respective side and end flanges of said frame members; each of said corner members having a pair of tongue elements at its lower end extending inwardly over the upper edges of a side and end flange of said bottom frame member and holding the corner of the bottom frame member against the lower end portions of the corner member and thence extending downwardly along the inner faces of the engaged flanges of said bottom frame member with resultant locking of the corner member against movement laterally of the engaged corner of said bottom member, and each of said corner members having corresponding tongue elements similarly interlockingly engaging the respective corners of said top frame member.

References Cited in the file of this patent

UNITED STATES PATENTS

| | | |
|---|---|---|
| 534,052 | Ruhe | Feb. 12, 1895 |
| 605,248 | Frohlich | June 7, 1898 |
| 1,432,827 | Bauer | Oct. 24, 1922 |
| 1,481,435 | Rossberger | Jan. 22, 1924 |
| 1,574,314 | Stone | Feb. 23, 1926 |
| 1,863,228 | McAdam | June 14, 1932 |
| 2,016,439 | Hogan | Oct. 8, 1935 |
| 2,026,901 | Leake et al. | Jan. 7, 1936 |
| 2,205,686 | Ehrlich | June 25, 1940 |
| 2,265,618 | Adams | Dec. 9, 1941 |
| 2,411,121 | Wilson | Nov. 12, 1946 |
| 2,423,955 | Widener | July 15, 1947 |
| 2,494,937 | Gandy | Jan. 17, 1950 |